United States Patent [19]

Boehnlein et al.

[11] Patent Number: 4,880,991

[45] Date of Patent: Nov. 14, 1989

[54] NON-CONTACT DIMENSIONAL GAGE FOR TURNED PARTS

[75] Inventors: Albert J. Boehnlein, Ypsilanti; Kevin G. Harding, Ann Arbor, both of Mich.

[73] Assignee: Industrial Technology Institute, Ann Arbor, Mich.

[21] Appl. No.: 349,957

[22] Filed: May 5, 1989

Related U.S. Application Data

[63] Continuation of Ser. No. 118,456, Nov. 9, 1987, abandoned.

[51] Int. Cl.$^4$ ............................................. G01J 3/45
[52] U.S. Cl. ..................................... 250/560; 356/346
[58] Field of Search ............... 250/560, 561; 356/376, 356/384–387

[56] References Cited

U.S. PATENT DOCUMENTS

| | | | |
|---|---|---|---|
| 3,461,299 | 8/1969 | Felix | 250/560 |
| 3,604,940 | 9/1971 | Matthews | 250/560 |
| 3,900,738 | 8/1975 | McKay, Sr. | 250/560 |
| 3,922,094 | 11/1975 | Colding et al. | 250/560 |
| 3,970,847 | 7/1976 | Wood | 250/560 |
| 4,021,119 | 5/1977 | Stauffer | 356/159 |
| 4,297,034 | 10/1981 | Ho et al. | 356/394 |
| 4,341,472 | 7/1982 | Gorog et al. | 250/561 |
| 4,381,152 | 4/1983 | Riech et al. | 250/560 |
| 4,555,633 | 11/1985 | Björkelund | 356/385 |

OTHER PUBLICATIONS 67.160$_2$ mm Measurement of Rotating Components with the Optoelectronic Measuring System, by the George Fisher Machine Corporation, Houston, Texas.
Optal Light Beam Measurement, by Candid Logic, Inc.

*Primary Examiner*—David C. Nelms
*Assistant Examiner*—Stephone B. Allen
*Attorney, Agent, or Firm*—Harness, Dickey & Pierce

[57] ABSTRACT

A non-contact dimensional gage for turned parts which permits in-process gaging for closed loop machine operations. The gage locates three points on the circumference of the cylindrical workpiece which are formed by shadowing the part onto three photo detectors receiving collimated light along three angled optical axes. The photo detectors evaluate the extent of shadowing of the light beams caused by the presence of the workpiece. The output of the photo detectors is a function of the degree of shadowing and accordingly provides a measure of the location of the tangent points of the workpiece. When the workpiece is positioned within the working range of the device such that three of the light beams are partially blocked by the workpiece, the three circumferentially spaced points can be located and consequently the part's diameter can be determined.

27 Claims, 2 Drawing Sheets

NON-CONTACT DIMENSIONAL GAGE FOR TURNED PARTS

This is a continuation of U.S. patent application Ser. No. 118,456, filed Nov. 9, 1987, now abandoned.

BACKGROUND AND SUMMARY OF THE INVENTION

This invention relates to a non-contact type dimensional gage and particularly to one for measuring the curvature of workpieces such as turned parts.

In producing precision turned workpieces, it is frequently necessary to carefully control workpiece diameters. Diameter values provide direct information about the quality of the part, the state of the machining process, and the cutting tool condition and positioning. In one general category of gaging apparatuses, finished workpieces are applied to gaging blocks or dimensional checking fixtures for measurement. Various types of such gaging systems are known, including those using dial indicators, touch probes, caliper gages, air gages, triangulation gages, laser scanning gages, etc. Such devices may be used in closed loop machining processes in which information about workpiece dimensions is used to adjust tool position, thus compensating for tool wear, etc. While such "post-process" gages are well adapted for numerous uses, there is a need to provide a gage which also can be used for "in-process" measurement which permits continual monitoring of workpiece diameter during the machining process. With this type of gaging, closed loop control for the machining operation for each workpiece can be provided, thus correcting for workpiece dimensional deviations. There is also a need to provide a non-contact type gage which does not rely on physical contact between two parts which gives rise to gage and workpiece wear. It is a further desirable feature for such a device to provide machining tool clearance without interfering with the gaging process. As a means of providing enhanced accuracy, it is advantageous for the gage to provide self-contained measurement which does not depend upon a remotely located datum, since the mechanisms coupling the gage to the datum can give rise to measurement errors.

SUMMARY OF THE INVENTION

A non-contact gaging device adaptable for in-process measurement is provided in accordance with this invention having the above mentioned desirable features. The gage locates three points on the circumference of the part which is done by shadowing the edge of the part at circumferentially spaced locations with light sources presenting beams sensed by photo detectors. The extent to which the light beams are interrupted defines the tangent point of intersection between the beam and the workpiece circumference, and thereby defines three points which describe the curvature of the part. Accordingly, the device operates much like a traditional V-block gaging device, but without requiring mechanical contact with a gage. The primary difference in the operation of the present gage is that all three detected points are non-physical points. Two of the tangent points serve as a registration of the part within the gage, analogous to the slanted sides of a V-block, except that a range of positions can be tolerated, making the position of the gage flexible within its working gage. The third tangent point is analogous to a dial indicator which uniquely determines the curvature of the part, and hence its diameter. The tangent points are preferably located along a partial angular segment of the workpiece, enabling measurements to be taken on one "side" of the workpiece, thus providing clearance for tool access, etc., during measurement. The light sources and photo detectors of the device are carried by a C-shaped gage housing having an open side which permits unobstructed access to the workpiece. Since the gage defines the three circumferentially spaced tangent points, it is not dependent upon fixed reference points or datum surfaces outside the gage, and therefore its accuracy is unaffected by gage or workpiece positioning errors.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
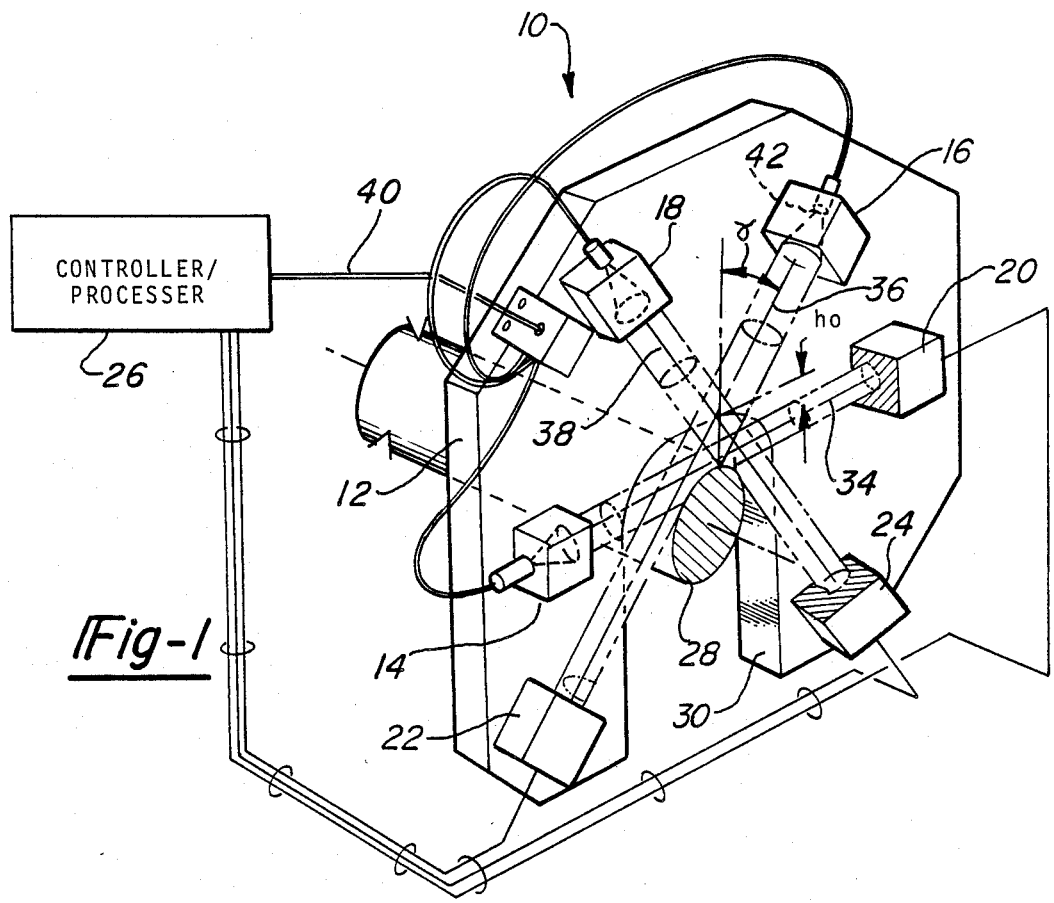
FIG. 1 is a pictorial view of a non-contact dimensional gage in accordance with the present invention showing the positioning of the light emitters and photo detectors, and showing the shadowing effect causing a portion of the emitted light beams to be blocked by the workpiece at circumferentially spaced locations.

FIG. 1 illustrates a non-contact dimensional gage for tuned parts in accordance with this invention shown in schematic form and which is generally designated by reference number 10. Gage 10 principally comprises housing 12, light emitters 14, 16, and 18, photo detectors 20, 22, and 24, and digital controller-processor 26. Workpiece 28 is shown in position to be evaluated by gage 10 and could be virtually any type with a curved or cylindrical outside surface such as those formed by lathe or grinding operations. Housing 12 defines a radial opening or mouth 30 which receives workpiece 28 while providing clearance for access by tooling to the surface of the workpiece, enabling gage 10 to be used during the machining process.

Light emitters 14, 16, and 18 present light beams having their optical axis 34, 36, and 38, directed to form and included angle therebetween. For the embodiment shown, the light output for each of the emitters 16, 18 and 20 is generated by a diode laser or LED within controller-processor 26, which is conducted via optical fibers 40. By remotely mounting the light source, it is isolated from vibrations imposed on gage housing 12. The use of optical fiber 40 also provides the advantage of producing a well defined point source of light. Optical axes 36 and 38 are each inclined at an angle α (shown as 30°) from a line normal to the tangent point of the workpiece formed by the light beam along optical axis 34. Various angles between axes of the light beams can be used successfully in connection with this invention. It is desirable, however, to select an included angle between the extreme tangent points of the light beams along optical axes 34, 36, and 38 and workpiece 28 which is less than 180°. In taking all measurements on one "side" of the workpiece by examining a narrow angular segment of workpiece 28, gage 10 is made unobtrusive when used in the manufacturing setting. For one experimental embodiment of this invention, light sources emitting an infrared output peaking at 850 nanometers were used. At each of light emitters 16, 18, and 20, a collimating lens 42 is provided to collimate the beam and spread it to a predetermined diameter. Collimation of the light beams is advantageous since a collimated beam is made up of rays which are everywhere parallel. Therefore, when the beam is interrupted anywhere along its path, an equal effect on intensity sensed by the associated photo detector results. If a diverging (or converging) beam is used, the amount of light blocked will depend on the point of interruptions along the beam. The diameter (or width if non-circular) of the light beams is important in determining the working range of the gage, since the gage depends on at least partial interruption of the beams by the workpiece surface.

Detectors 20, 22, and 24 have a circular aperture which receives light from light emitters 14, 16, and 18 over a sufficiently large aperture such that partial interruptions of the light beams can be detected as reductions in outputs from the associated photo detectors. Detectors 20, 22, and 24 are preferably provided with optical filters which match the frequency output of light emitters 14, 16, and 18, thus providing a means for blocking visible light and higher wavelength infrared light.

Controller-processor 26 contains a power supply and circuitry to drive light emitters 14, 16, and 18, and process signals from photo detectors 20, 22, and 24.

Figure 2:
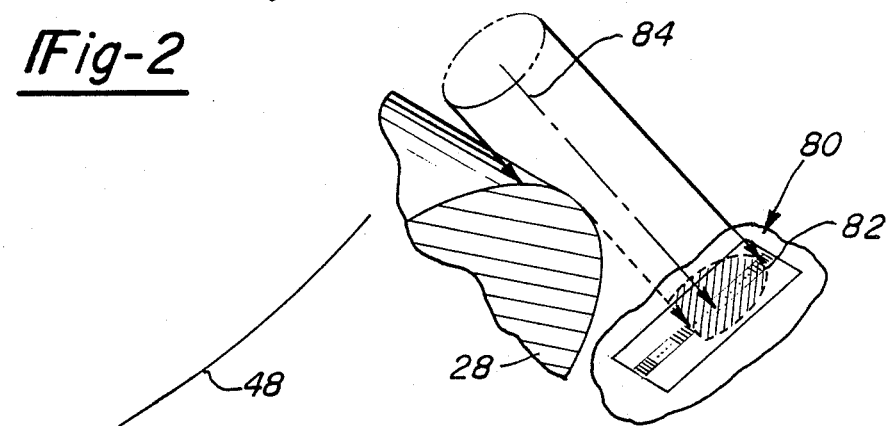
FIG. 2 is an example calibration curve showing the relationship between shadow distance and output voltage for one of the photo detectors shown in FIG. 1.

The principals of operation of gage 10 will now be described with reference to FIGS. 1 and 2. For the described embodiment, the included angle between optical axes 36 and 38 ($2\alpha$) is 60°. As mentioned previously, however, various included angles can be used successfully with gage 10. Small values of included angle increases the range of gage 10 and enables the gage to be unobtrusive, with a compromise in accuracy. Larger values of included angle enhance accuracy while decreasing range and requiring more of the workpiece to be enveloped by gage 10. The determination of the included angle therefore is a function of the intended application for the gage. When workpiece 28 is introduced into the working range of gage 10, each of the beams along optical axes 34, 36, and 38 is interrupted and a shadow is cast on the corresponding photo detector 20, 22, and 24, respectively. The output of each of the detectors is first calibrated using a workpiece of known diameter. The workpiece causes a shadow to be cast on the associated photo detector since a portion of the light beam is blocked. The voltage output for each of the photo detectors 20, 22, and 24, referred to as $V_1$, $V_2$, and $V_3$, respectively, is recorded along with the known extent of the interruption of the beam. Additional readings are taken with the beam fully blocked and unobstructed, thus providing a calibration curve. An example of such a calibration curve is shown in FIG. 2, which relates distance being shadowed along the ordinate, and voltage output from a photo detector along the abscissa, thus providing a characteristic curve 48. A suitable output voltage above background noise, e.g. 0.1 volt is chosen as a reference line. Perpendicular distances from the reference line to all other lines for that beam are calculated and plotted as a shadow (d) versus voltage (v) curve 48. Since the active element of each of detectors 20, 22, and 24 is typically circular, curve 48 is non-linear, even if the photo detector output is linear. Curve 48 could be linearized by using rectangular windowing techniques for the photo detectors, or the curves could be fit using higher order polynomial curve fitting equations.

In order to make a measurement, a workpiece 28 is introduced into gage 10 until the output of each detector is within its working range. Controller-processor 26 takes voltage readings and outputs an average diameter (D) value of the workpiece using the formula:

where $$D = K_1(h_0 + d_1) - K_2(d_2 + d_3)$$

$$K_1 = \frac{2 \sin \alpha}{1 - \sin \alpha}$$

$$K_2 = \frac{1}{1 - \sin \alpha} \text{ and}$$

$d_1$, $d_2$, and $d_3$ are shadow distances recorded by light detectors 20, 22, and 24, respectively, and $h_0$ is a gage constant.

The gage constant $h_0$ is determined using a known diameter in the above equation. In a preferred method of using gage 10, one of the light beams is used for positioning workpiece 28 which is located to produce a particular value of output voltage. Although using one of the light beams as a reference in this manner reduces the range and flexibility of gage 10, it results in increased accuracy. Once workpiece 28 is positioned using one beam and the remaining two beams and associated photo detectors provide an output within their working ranges, the calibration curves (such as 48) are employed by controller-processor 26 to determine the values of shadow distance (d), and thus the diameter (D).

Figure 3:
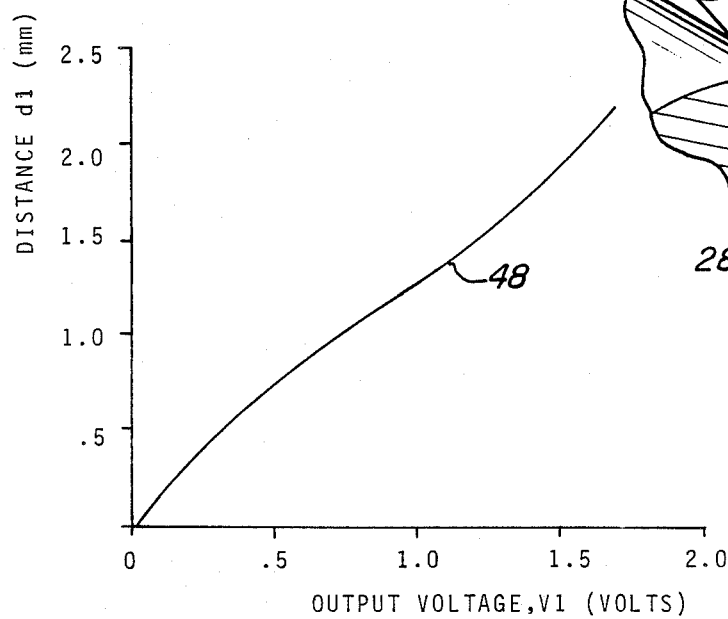
FIG. 3 is a partial pictorial view of an alternate embodiment of a photo detector for use with a gage according to this invention.

FIG. 3 is a partial pictorial view of an alternate embodiment of a photo detector 80 which may be used in connection with a gage according to this invention. Photo detector 80, rather than having a single light sensitive element like the photo detectors previously described, has an array of a large number of closely spaced photo sensitive regions 82 configured in a line. Light striking regions 82 is converted to a voltage. The voltages for each of regions 82 of photo detector 80 are read out in serial fashion as the photo detector is driven by a clock. FIG. 3 illustrates a condition in which a portion of a light beam having an optical axis 84 is blocked by workpiece 28. The portion of the light beam which passes over the workpiece circumference falls on photo detector 80 to illuminate a number of contiguous photo sensitive regions 82. The voltages produced at each of the photo sensitive regions 82 is thereafter read out in serial fashion as the information is clocked out of the device. The use of photo detector 80 enables high resolution measurements, limited only to the spacing of photo sensitive regions 82, and further provides a linear voltage output, thus eliminating the need for compensation for non-linearities required in conjunction with the first embodiment.

The outputs from linear detector array 80 represented by voltages from each of photo sensitive regions 82 can be handled in various fashions. In one approach, a threshold is compared with the voltage output from each of photo sensitive regions 82, and the outputs are then analyzed as either being above or below the threshold, depending upon whether they are in the bright or dark portion of the shadow cast by workpiece 28. This approach assumes a sharp transition between light and dark on detector 80 and would operate to provide a good indication of shadow position, but is not capable of providing extreme accuracy. The shadow cast by the interruption of a light beam by an object is, in reality, not a sharp well-defined transition between light and dark. If the light is not coherent, the transition is a smooth one causing the shadow edge to become smeared. However, if the light source is well collimated and at least partially coherent, as in the case of light emitters 14 through 18 which transmits light from an LED, as well defined Fresnel defraction pattern occurs on photo detector 80. The defraction pattern is regular and predictable, and is defined mathematically by the Fresnel integrals.

Figure 4:
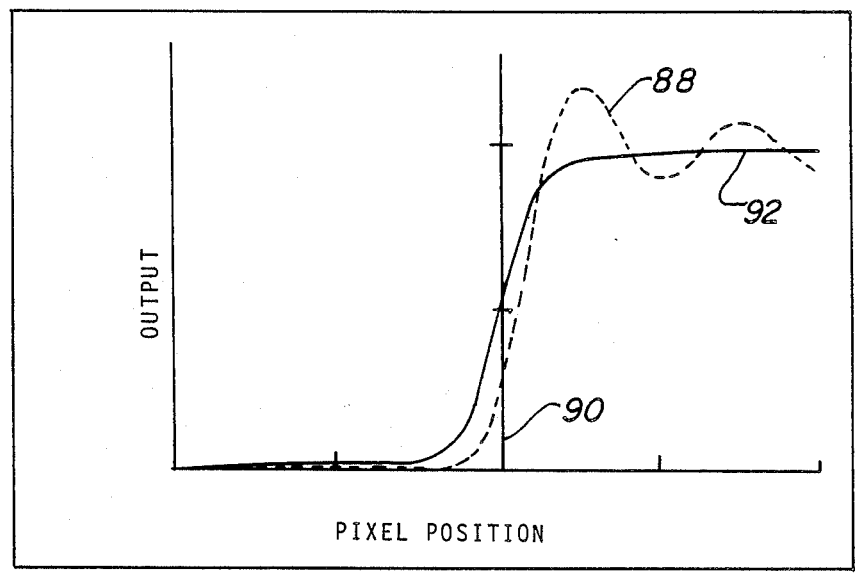
FIG. 4 is an example of an output from a linear array detector such as shown in FIG. 3 showing array pixel outputs in a region of the array being shadowed by a workpiece.

An alternate approach toward utilizing the outputs of photo detector 80 takes advantage of the characteristic pattern of the above described Fresnel defraction. FIG. 4 illustrates an exemplary relationship between pixel position (i.e., locations of light sensitive regions 82) represented along the ordinate, and the voltage output of individual photo sensitive regions 82 at various pixel positions, represented along the abscissa. Curve 88 illustrates the above referenced defraction pattern or "ringing" of the light in the shadow produced by an at least partially coherent beam. Vertical line 90 represents the geometric edge of workpiece 28 which gage 10 seeks to locate. Since the defraction pattern exemplified by curve 88 produces a well defined and predictable "signature" having a position determined by the location of the geometric edge of the part, the position of line 90 can be located with extreme accuracy by sampling the output of detector 80 to locate the defraction pattern signature. Once this characteristic pattern is identified, the geometric edge of the part can be located. The process of examining the output profile from photo detector 80 can be conducted by signal processing techniques such as auto-correlation, fourier analysis, signature recognition, polynomial approximation, and pattern recognition. Curve 92 of FIG. 4 represents the intensity profile produced by a broad band (incoherent) light source interrupted by a workpiece with a geometric edge at line 90. Curve 92 illustrates the smooth transition which occurs when using such light sources. Although curve 92 does not have a discernible diffraction or ringing characteristic, curve fitting techniques could be employed in evaluating curve 92 to locate line 90, much as it can be done using coherent sources.

Using this process of signature recognition of defraction patterns produces a number of significant additional advantages over the previously mentioned approach for handling output from photo detector 80 based on threshold comparisons. Using this approach, the information regarding the position of the geometric edge identified by line 90 is spread over a number of photo sensitive regions 82, which tends to increase the signal-to-noise ratio of the system. In addition, the defraction pattern tends to be degraded only slightly by local distortions in the image caused by dust, dirt, etc. The measurement is further relatively immune to background light since the signature pattern is being located rather than a certain intensity threshold. Finally, much finer subpixel interpolation is possible using this approach, and hence greater measurement accuracy is achievable. In real world conditions, accuracies of better than one-tenth pixel are expected using the above approach, although greater subpixel accuracies are theoretically achievable.

As a means of isolating the light beams detected by photo detectors 20, 22, and 24, different non-overlapping frequency bands could be outputted by each of the light emitters 16, 18, and 20 with appropriate band pass filters used at the associated photo detectors. Alternately, the photo detectors could be multiplexed such that only one of the emitters and associated photo detectors is operating at any given instant. For either of the embodiments described above, measurements can be taken on a "one-shot" basis, or as an average of a number of successive readings. Additionally, diameter calculations can be made for a stationary workpiece or one that is rotated to give data on ovality or lobeness of the workpiece.

While the above description constitutes the preferred embodiments of the present invention, it will be appreciated that the invention is susceptible to modification, variation and change without departing from the proper scope and fair meaning of the accompanying claims.

We claim:

1. An optical gage for evaluating the diameter of a workpiece comprising:
   light source means for presenting first, second, and third light beams oriented along mutually nonparallel optical axes which are generally tangent to said workpiece, said light beams having a width less than the diameter of said workpiece and are positioned to be partially interrupted by the outside surface of said workpiece wherein the included angle formed by the tangent points between said light beams and said workpiece is less than 180°,
   detector means for receiving said partially interrupted light beams and outputting a signal proportional to the extent of said interruption of each of said light beams, and
   processing means coupled to said detector means for receiving said detector means signals and outputting data representative of said interruption thereby evaluating the curvature of said workpiece.

2. An optical gage for evaluating the diameter of a workpiece of claim 1 wherein the angle between two of said optical axes is about 60°.

3. An optical gage for evaluating the diameter of a workpiece of claim 1 wherein said light beams are collimated at the point they are interrupted by said workpiece.

4. An optical gage for evaluating the diameter of a workpiece of claim 1 wherein said detector means comprises a single channel detector having an aperture sufficiently large to receive said light beams when not interrupted and while partially interrupted by said workpiece.

5. An optical gage for evaluating the diameter of a workpiece of claim 1 wherein said processing means further computes the diameter of said workpiece.

6. An optical gage for evaluating the diameter of a workpiece of claim 1 wherein said processing means calculates the diameter (D) of a cylindrical workpiece using the formula:

where $$D = K_1(h_0 + d_1) - K_2(d_2 + d_3)$$

$$K_1 = \frac{2 \sin \alpha}{1 - \sin \alpha}$$

$$K_2 = \frac{1}{1 - \sin \alpha} \text{ and}$$

$d_1$, $d_2$, and $d_3$ are shadow distances recorded by said detector means, and $h_0$ is a gage constant.

7. An optical gage for evaluating the diameter of a workpiece of claim 1 wherein said gage further comprises a gage mounting structure for positioning said light source means and said detector means.

8. An optical gage for evaluating the diameter of a workpiece of claim 1 wherein said detector means comprises a linear array of a multiplicity of light sensitive regions and providing an output representative of the intensity of illumination of said regions.

9. An optical gage for evaluating the diameter of a workpiece of claim 7 wherein said gage structure defines a radially extending slot enabling said workpiece to be received by said slot and positioned to partially interrupt said light beams and wherein said slot provides clearance for access by a cutting tool to said workpiece.

10. An optical gage for evaluating the diameter of a workpiece of claim 8 wherein said processing means compares a voltage output for each of said light sensitive regions to a threshold voltage to determine the location of the shadow on said array caused by said interruption by said workpiece.

11. An optical gage for evaluating the diameter of a workpiece of claim 8 wherein said light beams are collimated and at least partially coherent thereby forming a diffraction pattern of light intensity on said array, and said processing means evaluating the outputs of said light sensitive regions to locate said diffraction pattern and the position of the edge of said workpiece.

12. An optical gage for evaluating the diameter of a workpiece of claim 8 wherein said light beams are generated by broad band sources which produces a smooth transition between light and dark areas of said array and wherein said processing means evaluates the outputs of said light sensitive regions to locate said transition and the position of the edge of said workpiece.

13. An optical gage for evaluating the diameter of a workpiece comprising:
 a gage mounting structure,
 at least three light sources positioned by said gage mounting structure oriented to present light beams along mutually nonparallel optical axes, said light beams having a width less than the diameter of said workpiece and being sufficiently broad in width to be partially interrupted by said workpiece within a predetermined range, said light sources positioned to be partially interrupted by said workpiece generally tangent to the surface of said workpiece at circumferentially spaced positions about said workpiece wherein the included angle formed by the tangent points between said light beams and said workpiece is less than 180°,
 detector means for receiving said light beams after being interrupted by said workpiece and outputting a signal representative of the extent of said light beam interruption by said workpiece, and
 processing means coupled to said detector means for receiving said detector means signals and outputting data representative of said workpiece curvature.

14. An optical gage for evaluating the of a workpiece of claim 13 wherein the angle between two of said optical axes is about 60°.

15. An optical gage for evaluating the diameter of a workpiece of claim 13 wherein said light beams are collimated at the point they are interrupted by said workpiece.

16. An optical gage for evaluating the diameter of a workpiece of claim 13 wherein said detector means comprises a single channel detector having an aperture sufficiently large to receive said light beams when not interrupted and while partially interrupted by said workpiece.

17. An optical gage for evaluating the diameter of a workpiece of claim 13 wherein said processing means further computes the diameter of said workpiece.

where $$D = K_1(h_0 + d_1) - K_2(d_2 + d_3)$$

$$K_1 = \frac{2 \sin \alpha}{1 - \sin \alpha}$$

$$K_2 = \frac{1}{1 - \sin \alpha} \text{ and}$$

$d_1$, $d_2$, and $d_3$ are shadow distances recorded by said detector means, and $h_0$ is a gage constant.

18. An optical gage for evaluating the diameter of a workpiece of claim 13 wherein said processing means calculates the diameter (D) of a cylindrical workpiece using the formula:

19. An optical gage for evaluating the diameter of a workpiece of claim 13 wherein said gage further comprises a gage mounting structure for positioning said light sources and said detector means.

20. An optical gage for evaluating the diameter of a workpiece of claim 13 wherein said gage structure defines a radially extending slot enabling said workpiece to be received by said slot and positioned to partially interrupt said light beams and wherein said slot provides clearance for access by a cutting tool to said workpiece.

21. An optical gage for evaluating the diameter of a workpiece of claim 13 wherein said detector means comprises a linear array of a multiplicity of light sensitive regions and providing an output representative of the intensity of illumination of said regions.

22. An optical gage for evaluating the diameter of a workpiece of claim 21 wherein said processing means compares a voltage output for each of said light sensitive regions to a threshold voltage to determine the location of the shadow on said array caused by said interruption by said workpiece.

23. An optical gage for evaluating the diameter of a workpiece of claim 21 wherein said light beams are collimated and at least partially coherent thereby forming a diffraction pattern of light intensity onto said array, and said processing means evaluating the outputs of said light sensitive regions to locate said diffraction pattern and the position of the edge of said workpiece.

24. An optical gage for evaluating the diameter of a workpiece of claim 21 wherein said light beams are generated by broad band sources which produces a smooth transition between light and dark areas of said array and where said processing means evaluate the outputs of said light sensitive regions to locate said transitions and the position of the edge of said workpiece.

25. A method of determining the diameter of a cylindrical workpiece, comprising the steps of:

presenting three light beams which are oriented along mutually nonparallel optical axes which are oriented generally tangent to said workpiece and have a width less than the diameter of said workpiece, wherein the included angle formed by the tangent points between said light beams and said workpiece is less than 180°, positioning said workpiece such that said light beams are partially blocked by said workpiece at tangent points of said workpiece which are spaced circumferentially about said workpiece, measuring said light beams after being interrupted by said workpiece whereby a signal is generated representative of the extent of interruption of said light beam by said workpiece, and processing said signals to locate said tangent points thereby defining said curvature.

26. A method of determining the diameter of a cylindrical workpiece according to claim 25 wherein said positioning step includes placing said workpiece such that a predetermined signal level is measured for one of said light beams.

27. A method of determining the curvature of a cylindrical workpiece according to claim 25 wherein said light beams are composed of light that is at least partially coherent which said blocking of said light beams produces a diffraction pattern on a linear array detector used for said measuring, and wherein said processing step includes identifying and locating said diffraction pattern and thereby locating said tangent points.

* * * * *

UNITED STATES PATENT AND TRADEMARK OFFICE
CERTIFICATE OF CORRECTION

PATENT NO. : 4,880,991

DATED : November 14, 1989

INVENTOR(S) : Albert J. Boehnlein et al

It is certified that error appears in the above-identified patent and that said Letters Patent is hereby corrected as shown below:

Column 8, line 7, Claim 14, After "the" insert --diameter--.

Column 8, lines 24 - 34, Claim 18, The equation appearing in the patent at column 8, lines 24 - 34 should be after the word "formula: appearing in the patent at column 8, line 39.

Column 10, line 14, Claim 27, "curvature" should be --diameter--.

Signed and Sealed this

Twenty-sixth Day of March, 1991

Attest:

HARRY F. MANBECK, JR.

*Attesting Officer*     *Commissioner of Patents and Trademarks*